United States Patent
Mossman

(10) Patent No.: US 10,813,282 B2
(45) Date of Patent: Oct. 27, 2020

(54) HARVESTING HEAD WITH TENSION FRAME ASSEMBLY AND CENTRAL PIVOT

(71) Applicant: Deere & Company, Moline, IL (US)

(72) Inventor: Michael W. Mossman, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 269 days.

(21) Appl. No.: 16/041,121

(22) Filed: Jul. 20, 2018

(65) Prior Publication Data

US 2020/0022304 A1  Jan. 23, 2020

(51) Int. Cl.
A01D 34/24 (2006.01)
A01D 34/04 (2006.01)
A01D 34/14 (2006.01)
A01D 61/00 (2006.01)

(52) U.S. Cl.
CPC .......... *A01D 34/24* (2013.01); *A01D 34/04* (2013.01); *A01D 34/14* (2013.01); *A01D 61/008* (2013.01)

(58) Field of Classification Search
CPC ........ A01D 34/24; A01D 34/04; A01D 34/14; A01D 61/008; A01D 75/287; A01D 34/86; A01D 41/14; A01D 41/16; A01D 47/00
See application file for complete search history.

(56) References Cited

U.S. PATENT DOCUMENTS

| | | | |
|---|---|---|---|
| 4,266,395 A | 5/1981 | Basham | |
| 5,341,628 A | 8/1994 | Schumacher, II et al. | |
| 6,202,397 B1 * | 3/2001 | Watts | A01D 61/002 56/14.5 |
| 7,234,291 B2 | 6/2007 | Rickert | |
| 7,650,736 B1 * | 1/2010 | Salley | A01D 41/16 56/181 |
| 7,802,417 B2 | 9/2010 | Sauerwein et al. | |
| 7,926,248 B2 * | 4/2011 | Schmidt | A01D 41/14 56/181 |
| 10,426,088 B2 * | 10/2019 | Mossman | A01D 41/14 |
| 2002/0005033 A1 | 1/2002 | Uhlending et al. | |
| 2008/0161077 A1 * | 7/2008 | Honey | A01D 41/16 460/106 |
| 2012/0291412 A1 * | 11/2012 | Lovett | A01D 61/002 56/181 |

(Continued)

FOREIGN PATENT DOCUMENTS

| | | |
|---|---|---|
| EP | 3072382 A1 | 9/2016 |
| EP | 3117697 A1 | 1/2017 |

OTHER PUBLICATIONS

European Search Report issued in counterpart European Patent Application No. 19185217.7 dated Dec. 20, 2019 (4 pages).

*Primary Examiner* — Arpad Fabian-Kovacs
(74) *Attorney, Agent, or Firm* — Taft Stettinius & Hollister LLP; Stephen F. Rost

(57) ABSTRACT

A harvesting machine includes a main frame, a cutter assembly, and a conveyor system. The cutter assembly is pivotally coupled to the main frame. The cutter assembly includes a cutter bar configured to sever crop material adjacent to the ground and a cutter frame configured to support the cutter bar for pivotal movement relative to the main frame. The conveyor system is coupled to the main frame and configured to convey severed crop material in a rearward direction away from the cutter bar toward a central feed drum of the harvesting machine.

19 Claims, 7 Drawing Sheets

(56) References Cited

U.S. PATENT DOCUMENTS

| | | | |
|---|---|---|---|
| 2013/0097986 A1* | 4/2013 | Lovett | A01D 41/14 56/153 |
| 2013/0105282 A1* | 5/2013 | Hoffman | A01D 57/20 198/814 |
| 2016/0360698 A1 | 12/2016 | Ducroquet et al. | |
| 2017/0013778 A1 | 1/2017 | Borry et al. | |
| 2019/0380273 A1* | 12/2019 | Mossman | A01D 57/20 |

* cited by examiner

HARVESTING HEAD WITH TENSION FRAME ASSEMBLY AND CENTRAL PIVOT

FIELD OF THE DISCLOSURE

The present disclosure relates, generally, to agricultural harvesters, and, more specifically, to harvesting heads for agricultural combines.

BACKGROUND

Agricultural harvesters, such as agricultural combines, may be designed to travel through agricultural fields harvesting crops. Crop material severed from the ground by the agricultural combine may be conveyed to threshing, separating, and cleaning devices within the agricultural combine. In some cases, a self-propelled agricultural harvesting vehicle may include a harvesting head having one or more mechanisms to move crop material through the harvesting head.

SUMMARY

The present disclosure may comprise one or more of the following features and combinations thereof.

According to one aspect of the present disclosure, a harvesting machine may include a main frame, a cutter assembly, and a conveyor system. The cutter assembly may be pivotally coupled to the main frame. The cutter assembly may include a cutter bar configured to sever crop material adjacent to the ground and a cutter frame configured to support the cutter bar for pivotal movement relative to the main frame. The conveyor system may be coupled to the main frame and configured to convey severed crop material in a rearward direction away from the cutter bar toward a central feed drum of the harvesting machine. The conveyor system may include a rear mount unit affixed to the main frame and a front pivot unit positioned forward of the rear mount unit that is pivotally coupled to the rear mount unit. The front pivot unit may be coupled to the cutter assembly to permit the front pivot unit and the cutter bar to pivot relative to the main frame based on a contour of the ground during operation of the harvesting machine.

In some embodiments, the rear mount unit may include a rear roller that is configured for rotation about a rear roller axis, the front pivot unit may include a front roller that is configured for rotation about a front roller axis, and the front roller axis may be angled relative to the rear roller axis when the front pivot unit and the cutter bar pivot relative to the main frame during operation of the harvesting machine. The central feed drum may be configured for rotation about a feed drum axis, and the feed drum axis may be parallel to the rear roller axis when the front pivot unit and the cutter bar pivot relative to the main frame during operation of the harvesting machine.

In some embodiments, the rear mount unit may include a central housing and a front pivot unit interface that extends outwardly of the central housing toward the front pivot unit, and the front pivot unit interface may be located along a central axis of the conveyor system. The front pivot unit may include a central bracket configured to receive the front unit pivot interface of the rear mount unit, and the central bracket may be located along the central axis of the conveyor system. The front pivot unit interface may include a rod and the central bracket may at least partially define a passageway sized to receive the rod. The front pivot unit may include a pivot bearing coupled to the central bracket that is configured to interact with the rod to permit pivotal movement of the front pivot unit relative to the rear mount unit during operation of the harvesting machine.

In some embodiments, the rear mount unit may include a first end plate and a second end plate arranged opposite the first end plate, the central housing may be positioned between the first and second end plates, and the first and second end plates may be coupled to opposite ends of a rear roller of the rear mount unit to support the rear roller. The front pivot unit may include a first end bracket and a second end bracket arranged opposite the first end bracket, the central bracket may be positioned between the first and second end brackets, and the first and second end brackets may be coupled to opposite ends of a front roller of the front pivot unit to support the front roller. The conveyor system may further include an equalizer bar sized for receipt in slots formed in each of the first and second end brackets, and the equalizer bar may be configured to receive the front pivot unit interface of the rear mount unit. The equalizer bar may cooperate with at least one of the front pivot unit interface and the front pivot unit to facilitate adjustment of tension applied to at least one component of the conveyor system during operation of the harvesting machine. The at least one component may include a belt that is wound at least partway around the rear roller and the front roller.

According to another aspect of the present disclosure, a harvesting machine may include a main frame, a cutter assembly, and a conveyor system. The cutter assembly may be pivotally coupled to the main frame and configured to sever crop material adjacent to the ground. The conveyor system may be coupled to the main frame and configured to convey severed crop material rearwardly. The conveyor system may include a rear mount unit affixed to the main frame and a front pivot unit pivotally coupled to the rear mount unit. The front pivot unit may be coupled to the cutter assembly for common pivotal movement with the cutter bar relative to the main frame.

In some embodiments, the front pivot unit and the rear mount unit may be pivotally coupled together by a pivot joint that is located along a central axis of the conveyor system. Additionally, in some embodiments, the conveyor system may further include an equalizer bar that is supported by the front pivot unit and configured to cooperate with at least one of the rear mount unit and the front pivot unit to facilitate adjustment of tension applied to at least one component of the conveyor system during operation of the agricultural harvesting head. Additionally, in some embodiments still, the rear mount unit may include a rear roller that is configured for rotation about a rear roller axis, the front pivot unit may include a front roller that is configured for rotation about a front roller axis, and the front roller axis may be angled relative to the rear roller axis when the front pivot unit and the cutter bar pivot relative to the main frame.

According to yet another aspect of the present disclosure, a harvesting machine may include a main frame, a cutter assembly, and a conveyor system. The cutter assembly may be pivotally coupled to the main frame and configured to sever crop material adjacent to the ground. The conveyor system may be coupled to the main frame and configured to convey severed crop material rearwardly. The conveyor system may include a rear mount unit, a front pivot unit, and an equalizer bar. The rear mount unit may be affixed to the main frame. The front pivot unit may be pivotally coupled to the rear mount unit and coupled to the cutter assembly for common pivotal movement with the cutter bar relative to the main frame. The equalizer bar may be supported by the front pivot unit and configured to cooperate with at least one of the rear mount unit and the front pivot unit to facilitate adjustment of tension applied to at least one component of the conveyor system during operation of the agricultural harvesting head.

In some embodiments, the rear mount unit may include a rear roller that is configured for rotation about a rear roller axis, the front pivot unit may include a front roller that is configured for rotation about a front roller axis, and the front roller axis may be angled relative to the rear roller axis when the front pivot unit and the cutter bar pivot relative to the main frame during operation of the agricultural harvesting head. The front pivot unit and the rear mount unit may be pivotally coupled together by a pivot joint that is located along a central axis of the conveyor system, the at least one component of the conveyor system may include a belt that is wound at least partway around the rear roller and the front roller such that a central portion of the belt is located along the central axis, and the location of the pivot joint may facilitate application of tension to opposite ends of the belt by the rear and front rollers to maintain the location of the central portion of the belt along the central axis during operation of the agricultural harvesting head. At least a portion of the pivot joint may be received by the equalizer bar, and the central axis may be arranged perpendicular to the rear roller axis.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
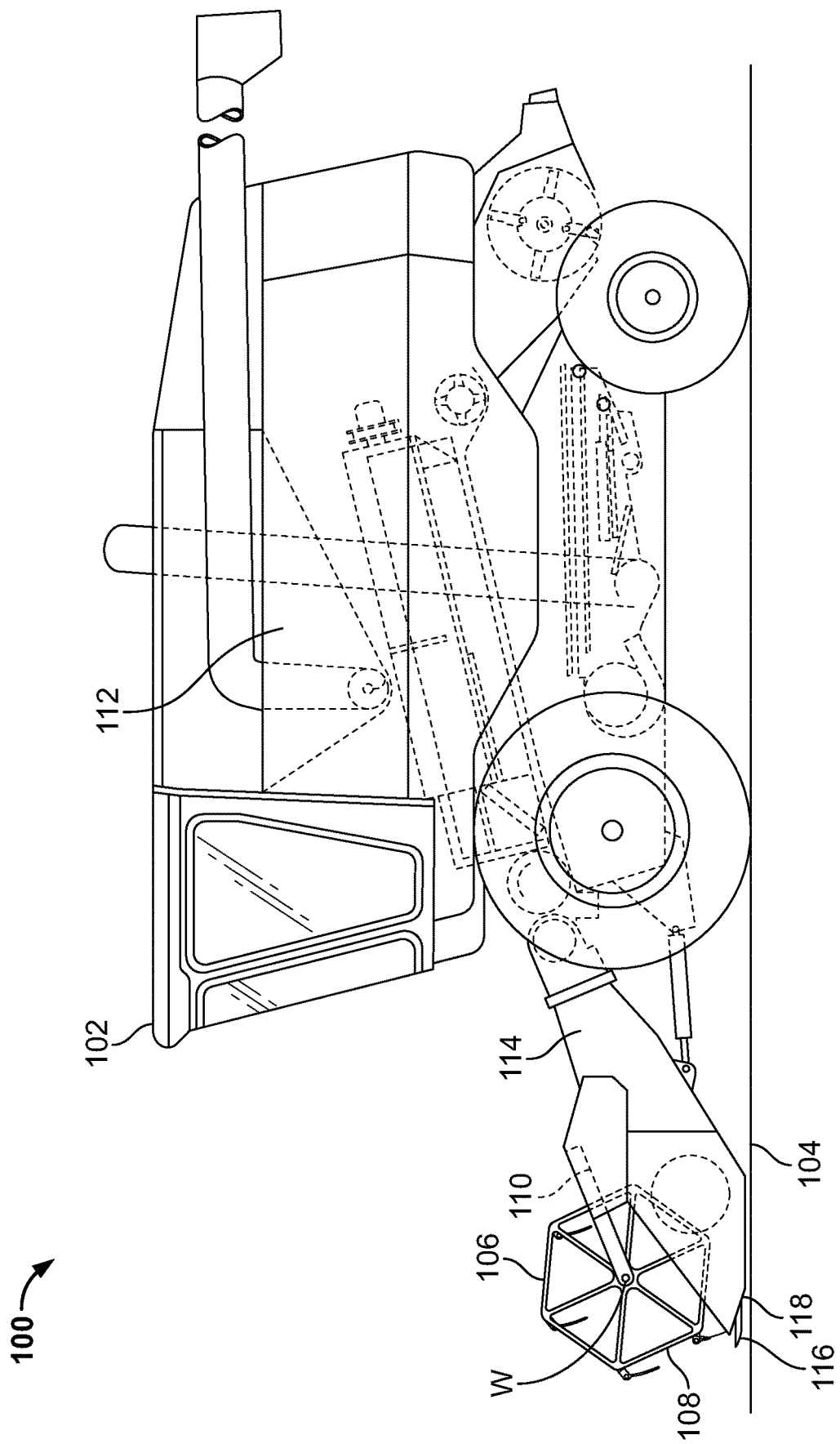
FIG. 1 is a side perspective view of an agricultural combine.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an agricultural harvesting machine 100 illustratively includes, or is otherwise embodied as, an agricultural combine 102. The agricultural combine 102 is configured to travel through a field to harvest crop material 104. Of course, it should be appreciated that in other embodiments, the harvesting machine 100 may include, or otherwise be embodied as, another suitable harvesting machine. In any case, in the illustrative embodiment, the agricultural combine 102 is embodied as an agricultural harvesting vehicle that includes an agricultural harvesting head 106 disposed at a forward end 108 thereof. The agricultural harvesting head 106 may also be referred to herein as a draper header.

In the illustrative embodiment, the draper header 106 is configured to sever crop material 104, convey the severed crop material 104 laterally toward a central feed section 110 of the draper header 106, and convey the severed crop material 104 through the central feed section 110 toward various other devices housed in the agricultural combine 102. In some embodiments, the draper header 106 may be coupled to, or otherwise supported by, a chassis or frame 112 of the combine 102 such that the draper header 106 extends outwardly from the chassis 112. Additionally, in some embodiments, the draper header 106 may be embodied as, or otherwise include, a draper platform having a width W that corresponds to the width of one of the following: the John Deere 745FD draper platform, the John Deere 740FD draper platform, the John Deere 735FD platform, the John Deere 730FD platform, the John Deere 740D draper platform, the John Deere 735D draper platform, the John Deere 730D draper platform, the John Deere 725D draper platform, and the John Deere 615P Belt Pickup draper platform. Of course, it should be appreciated that in other embodiments, the draper header 106 may be embodied as, or otherwise include, a draper platform having another suitable width.

In the illustrative embodiment, the agricultural harvesting head 106 includes a main frame 114 and a cutter assembly 116. The main frame 114 at least partially supports the various components of the harvesting head 106 discussed below, and in some embodiments, the main frame 114 may be coupled directly to the chassis 112. The cutter assembly 116 is pivotally coupled to the main frame 114 and configured to sever crop material 104 adjacent to the ground. To that end, the illustrative cutter assembly 116 includes a cutter bar or knife 118 located adjacent the ground to sever crop material 104. Because the cutter assembly 116 is pivotally coupled to the main frame 114, one or more components of the cutter assembly 116 may pivot or flex relative thereto based on the contour of the ground during operation of the agricultural harvesting head 106, as discussed below.

Figure 2:
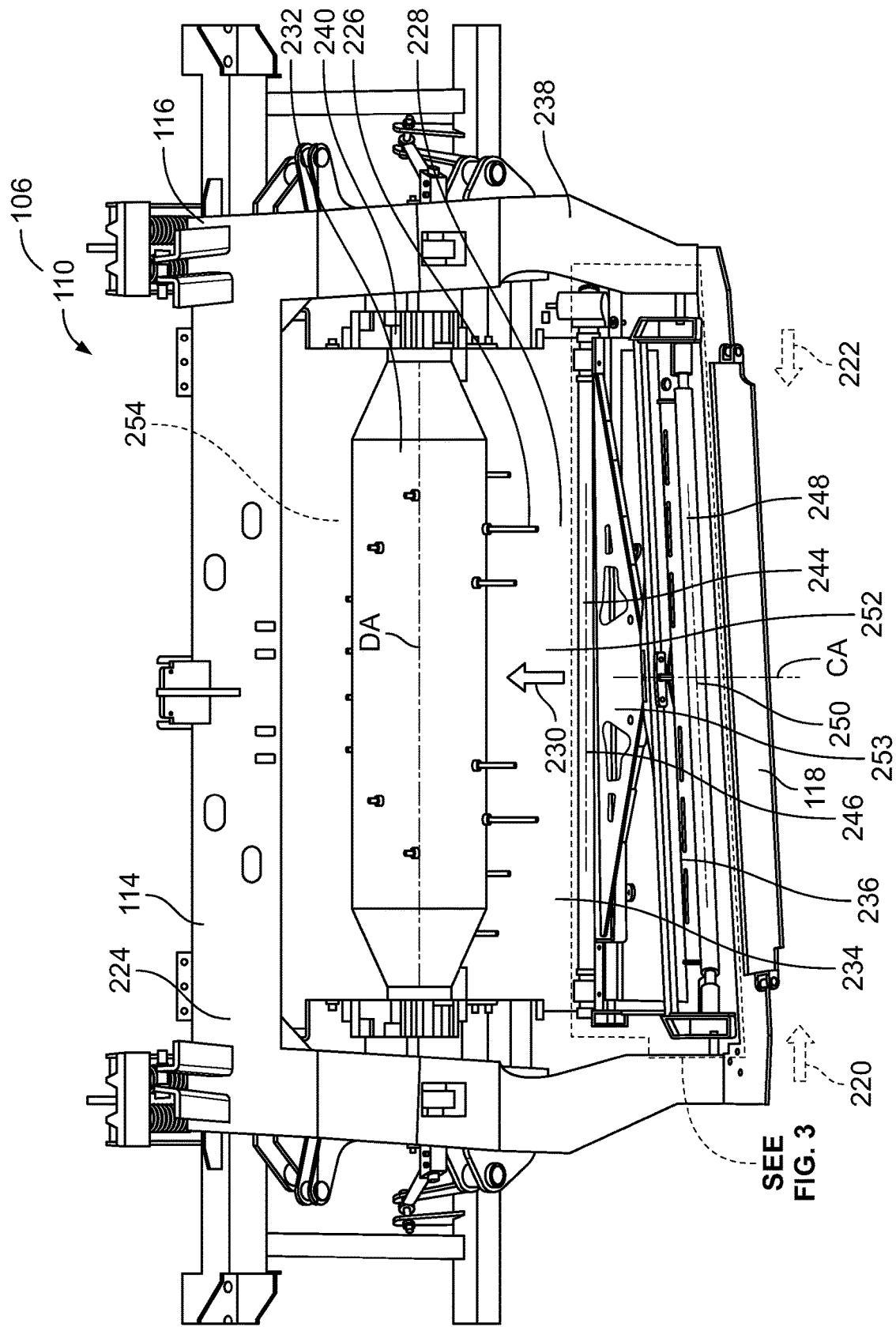
FIG. 2 is a front perspective view of an agricultural harvesting head of the agricultural combine of FIG. 1.

Referring now to FIG. 2, the central feed section 110 of the agricultural harvesting head 106 is configured to receive crop material 104 severed by the cutter assembly 116 during operating of the harvesting head 106. In some embodiments, crop material 104 severed by the cutter assembly 116 may be conveyed laterally along the width W of the harvesting head 106 to the central feed section 110, as indicated by arrows 220, 222. In any case, the cutter assembly 116 includes a cutter frame 224 that is configured to support the cutter bar 118 for pivotal movement relative to the main frame 114. In the illustrative embodiment, the cutter frame 224 and the cutter bar 118 are therefore capable of pivoting or flexing relative to the main frame 114 based on the contour of the ground.

The illustrative agricultural harvesting head 106 includes a conveyor system 226 that is coupled to the main frame 114. The conveyor system 226 is configured to convey severed crop material 104 in a rearward direction indicated by arrow 230 away from the cutter bar 118 toward a central feed drum 232 of the harvesting head 106. In the illustrative embodiment, the conveyor system 226 includes, or is otherwise embodied as, a tension frame assembly 228. The tension frame assembly 228 includes a rear mount unit 234 affixed to the main frame 114 and a front pivot unit 236 positioned forward of the rear mount unit 234 that is pivotally coupled to the rear mount unit 234. The front pivot unit 236 is coupled to the cutter assembly 116 to permit the front pivot unit 236 and the cutter bar 118 to pivot relative to the main frame 114 based on the contour of the ground during operation of the harvesting head 106. As a result, the front pivot unit 236 is coupled to the cutter assembly 116 for common pivotal movement with the cutter bar 118 relative to the main frame 114.

In the illustrative embodiment, the front pivot unit 236 is coupled to arms or wings 238 of the cutter frame 224 that extend toward, and are connected to, the cutter bar 118. The rear mount unit 234 is coupled to a feed drum frame 240 that is configured to support the central feed drum 232 for rotation about a feed drum axis DA. The feed drum frame 240 is illustratively embodied as, or otherwise includes, a stationary structure that is coupled to, included in, or otherwise integral with the main frame 114. It should be appreciated that in other embodiments, the front pivot unit 236 may be coupled to other suitable components of the cutter assembly 116. Moreover, it should be appreciated that in other embodiments, the rear mount unit 234 may be coupled to other suitable components supported by, or included in, the main frame 114.

The illustrative rear mount unit 234 includes, or is otherwise coupled to, a rear roller 244 that is configured for rotation about a rear roller axis 246. As best seen in FIG. 2, the rear roller axis 246 is parallel to the feed drum axis DA. Because the rear mount unit 234 is affixed to the feed drum frame 240, the parallel relationship between the rear roller axis 246 and the feed drum axis DA is maintained when the front pivot unit 236 and the cutter bar 118 pivot relative to the main frame 114 during operation of the harvesting head 106.

The illustrative front pivot unit 236 includes, or is otherwise coupled to, a front roller 248 that is configured for rotation about a front roller axis 250. Depending on the contour of the ground adjacent the forward end 108 of the agricultural combine 102, the front roller axis 250 may be angled relative to the rear roller axis 246 when the front pivot unit 236 and the cutter bar 118 pivot relative to the main frame 114 during operation of the harvesting head 106. Thus, the front roller axis 250 and the rear roller axis 246 may have a non-parallel relationship during operation of the harvesting head 106.

In the illustrative embodiment, a belt 252 of the tension frame assembly 228 is wound completely around, or extends at least partway around, each of the rear roller 244 and the front roller 248. The belt 252 is configured to convey severed crop material 104 in the rearward direction 230 to the central feed drum 232. After passing beneath the central feed drum 232, the severed crop material may be conveyed to a feeder house 254 of the agricultural combine 102. In any case, as further discussed below, the tension frame assembly 228 may be configured to adjust tension applied to one or more components of the conveyor system 226 during operation of the harvesting head 106, at least in some embodiments.

Figure 3:
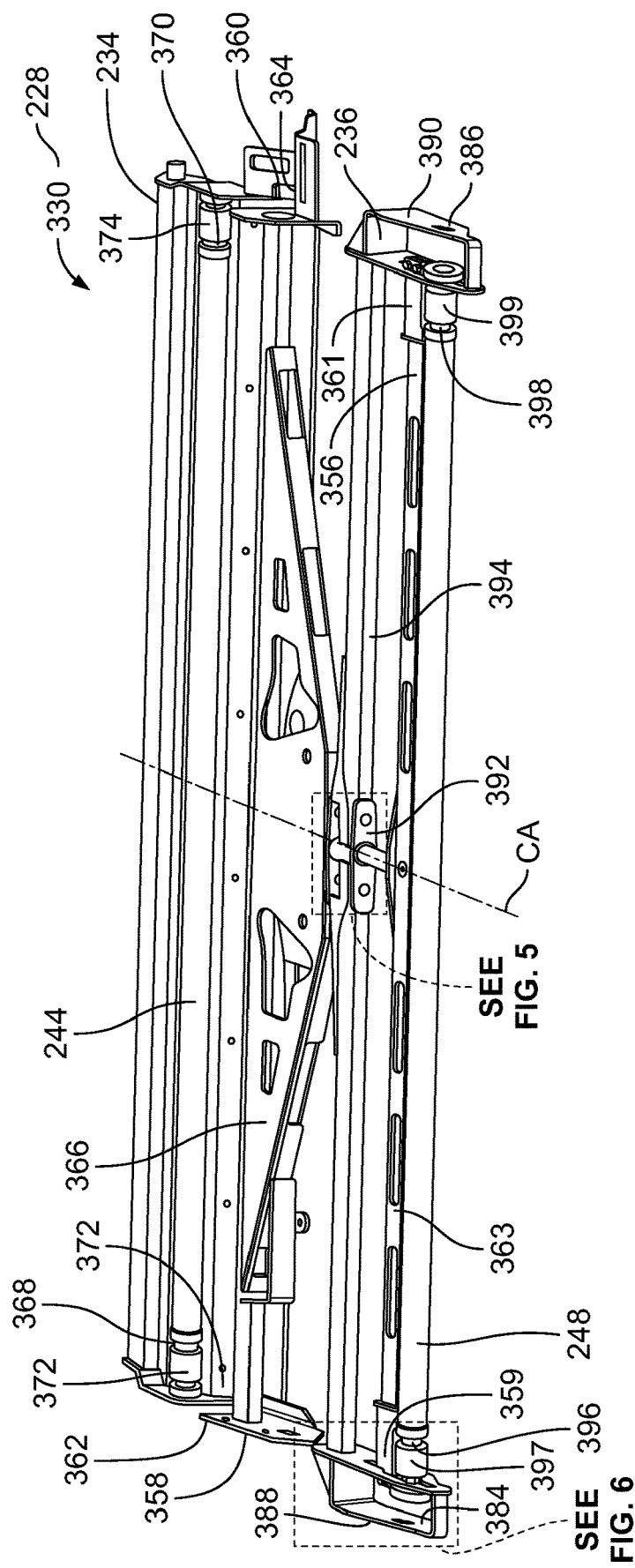
FIG. 3 is a front perspective view of a portion of a tension frame assembly that may be included in a conveyor system of the agricultural harvesting head of FIG. 2.
Figure 4:
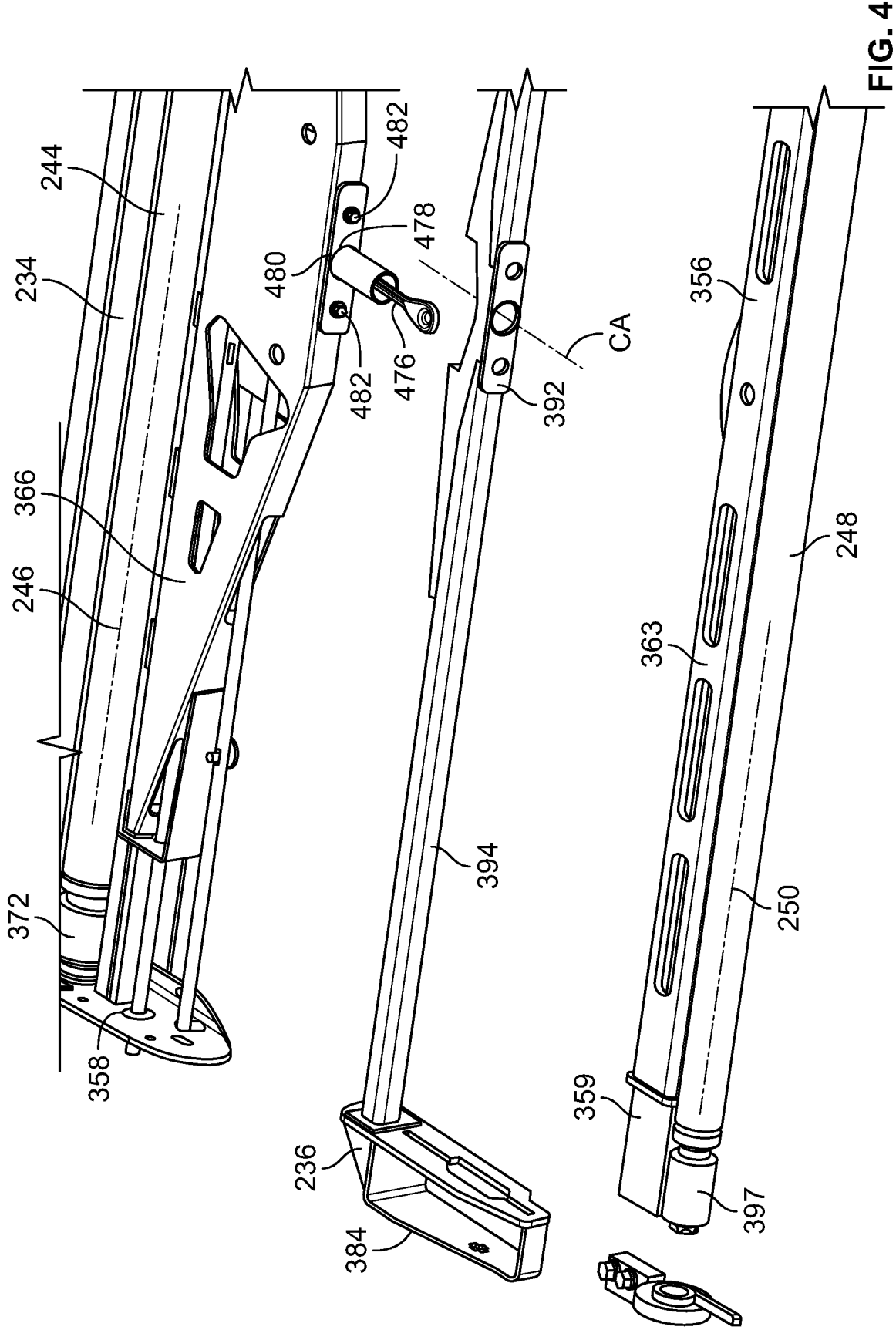
FIG. 4 is an exploded perspective view of the tension frame assembly shown in FIG. 3.

Referring now to FIGS. 3 and 4, a portion 330 of the tension frame assembly 228 is shown de-coupled from the cutter frame 224 and the feed drum frame 240. More specifically, the rear mount unit 234, the front pivot unit 236, and an equalizer bar 356 included in the tension frame assembly 228 are shown removed from the cutter frame 224 and the feed drum frame 240. Those components are shown assembled together (see FIG. 3) and exploded from one another (see FIG. 4).

In the illustrative embodiment, the rear mount unit 234 includes an end plate 358, an end plate 360, and a central housing 366. The end plates 358, 360 are arranged opposite one another to define opposite ends 362, 364 of the rear mount unit 234, respectively. The central housing 366 is positioned between the end plates 358, 360 and configured to house one or more components of the tension frame assembly 228. In some embodiments, the central housing 366 may be supported by, and/or coupled to, one or more rods, bars, linkages, frames, members, beams, arms, belts, wires, or the like, which may extend between the end plates 358, 360, and which may be constrained against movement. Additionally, in some embodiments, the rear mount unit 234 may include one or more rods, bars, linkages, frames, members, beams, arms, belts, wires, shields, covers, plates, guides, tracks, or the like, which may extend between the end plates 358, 360 without providing support for, or being coupled to, the central housing 366.

In the illustrative embodiment, the rear roller 244 is supported by, and extends between, the end plates 358, 360. An end 368 of the rear roller 244 is coupled to the end plate 358, and an end 370 of the rear roller 244 that is arranged opposite the end 368 is coupled to the end plate 360. The ends 368, 370 may be coupled to the corresponding end plates 358, 360 by bearings 372, 374, and the bearings 372, 374 may cooperatively support the rear roller 244 for rotation about the rear roller axis 246.

The illustrative rear mount unit 234 includes a front pivot unit interface 476 that extends outwardly from the central housing 366 toward the front pivot unit 236, as shown in FIG. 4. In the illustrative embodiment, the front unit pivot interface 476 is located along, and is linearly in-line with, a central axis CA of the conveyor system 226, which is arranged perpendicular to the feed drum axis DA and the rear roller axis 246. As further described below, the front pivot unit 236 is configured to interact with the front pivot unit interface 476 to facilitate pivoting of the front pivot unit 236 relative to the rear mount unit 234 during operation of the agricultural harvesting head 106. Additionally, as further described below, the front pivot unit 236 and the equalizer bar 356 are configured to receive the front pivot unit interface 476 of the rear mount unit 234.

The illustrative front pivot unit interface 476 extends through a passage 478 cooperatively defined by the central housing 366 and a stop plate 480 included in the rear mount unit 234. The stop plate 480 is affixed to the central housing 366 by fasteners 482. In some embodiments, the fasteners 482 may include, or otherwise be embodied as, stops 500 (see FIG. 5), which may be configured to interact with a feature of the front pivot unit 236 to constrain pivotal movement of the front pivot unit 236 relative to the rear mount unit 234 during operation of the agricultural harvesting head 106.

In the illustrative embodiment, the front pivot unit 236 includes an end bracket 384, an end bracket 386, and a central bracket 392. The end brackets 384, 386 are arranged opposite one another to define opposite ends 388, 390 of the front pivot unit 236, respectively. The central bracket 392 is positioned between the end brackets 384, 386 and configured to receive the front unit pivot interface 476 of the rear mount unit 234. The central bracket 392 is coupled to, and supported by, a crossbar 394 of the rear mount unit 234.

In the illustrative embodiment, the front roller 248 is supported by, and extends between, the end brackets 384, 386. An end 396 of the front roller 248 is coupled to the end bracket 384, and an end 398 of the front roller 248 that is arranged opposite the end 396 is coupled to the end bracket 386. The ends 396, 398 may be coupled to the corresponding end brackets 384, 386 by bearings 397, 399, and the bearings 397, 399 may cooperatively support the front roller 248 for rotation about the front roller axis 250.

The illustrative central bracket 392 is located along, and is linearly in-line with, the central axis CA of the conveyor system 226. When the central bracket 392 receives the front pivot unit interface 476 of the rear mount unit 234, the front pivot unit 236 and the rear mount unit 234 are therefore coupled to one another along the central axis CA. As discussed below, a pivot joint 502 (see FIG. 5) is at least partially established by the central bracket 392, the front pivot unit interface 476, and a pivot bearing 504 along the central axis CA. As described in greater detail below, the rear mount unit 234 and the front pivot unit 236 are pivotally coupled together by the pivot joint 502.

The illustrative equalizer bar 356 is supported by, and extends between, the end brackets 384, 386 of the front pivot unit 236. An end bracket coupler 359 of the equalizer bar 356 is coupled to the end bracket 384, and an end bracket coupler 361 of the equalizer bar 356 that is arranged opposite the end bracket coupler 359 is coupled to the end bracket 386. A main body 363 of the equalizer bar 356 extends between and interconnects the end bracket couplers 359, 361. As discussed below, the equalizer bar 356 is configured to cooperate with at least one of the rear mount unit 234 and the front pivot unit 236 to facilitate adjustment of tension applied to the belt 252 of the tension frame assembly 228 during operation of the agricultural harvesting head 106, at least in some embodiments.

Figure 5:
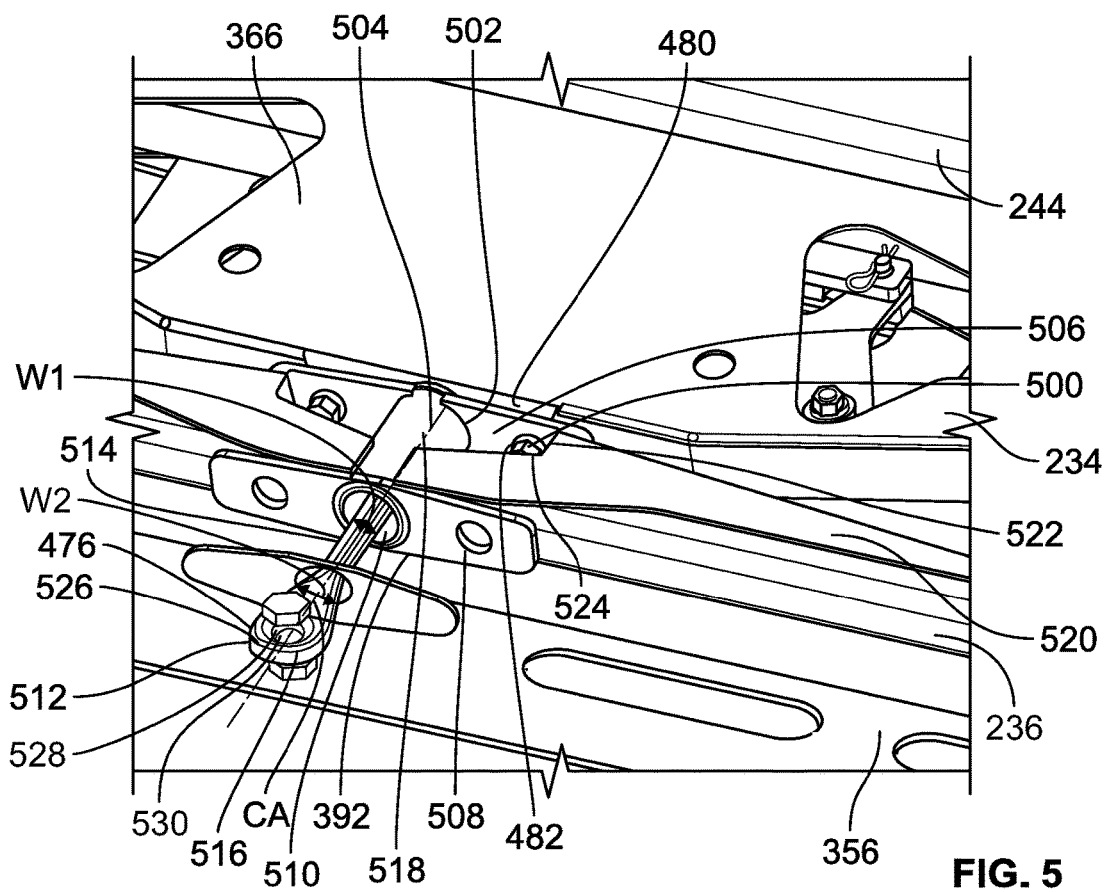
FIG. 5 is a detail view of a central pivot of the tension frame assembly shown in FIG. 3.

Referring now to FIG. 5, the central bracket 392, the front pivot unit interface 476, and the pivot bearing 504 cooperatively establish the illustrative pivot joint 502. During operation of the agricultural harvesting head 106, the pivot joint 502 enables, or otherwise facilitates, pivotal movement of the front pivot unit 236 relative to the rear mount unit 234. In the illustrative embodiment, due to the location of the pivot joint 502 along, and linearly in-line with, the central axis CA, the pivot joint 502 may cooperate with other elements of the tension frame assembly 228 to enable, or otherwise facilitate, centering of the belt 252 to a greater degree than might otherwise be the case if the pivot joint 502 had a different location. Put another way, because the pivot joint 502 is located along the central axis CA in the illustrative configuration, the pivot joint 502 may, in cooperation with other elements of the tension frame assembly 228, enable, or otherwise facilitate, positioning of a central portion 253 of the belt 252 along the central axis CA to a greater degree than might otherwise be the case in a different configuration.

In the illustrative embodiment, the central bracket 392 of the front pivot unit 236 includes bracket plates 506, 508 that are coupled to the crossbar 394 opposite one another. The bracket plate 506 is arranged to face and/or interact with the stop plate 480 of the rear mount unit 234. In some embodiments, the bracket plate 506 may be coupled to the stop plate 480 by the fasteners 482. In any case, the bracket plate 508 is arranged to face away from the stop plate 480. The bracket plates 506, 508 and the crossbar 394 cooperate to define a passageway 510 that extends through the front pivot unit 236 and is located along, and is linearly in-line with, the central axis CA.

In the illustrative embodiment, the front pivot unit interface 476 includes, or is otherwise embodied as, a rod or pushrod 512 that is sized to be received in the passageway 510. The rod 512 includes a rod body 514 and a rod head 516 coupled thereto. The rod body 514 has a width W1 that is less than a width W2 of the rod head 516. The rod body 514 is sized to extend through the passageway 510 and beyond the bracket plate 508 such that the rod head 516 is positioned outside of the passageway 510 when the front pivot unit 236 is pivotally coupled to the rear mount unit 234 at the pivot joint 502.

In the illustrative embodiment, the pivot bearing 504 includes, or is otherwise embodied as, a cylindrical sleeve 518 sized to be positioned between the bracket plates 506, 508 of the central bracket 392. The cylindrical sleeve 518 may be at least partially received by the crossbar 394 such that the sleeve 518 is at least partially positioned in the passageway 510, at least in some embodiments. In any case, the sleeve 518 extends around the central axis CA to surround the rod body 514 of the rod 512. During operation of the agricultural harvesting head 106, the rod 512, the sleeve 518, and the central bracket 392 are configured to interact to permit pivotal movement of the front pivot unit 236 relative to the rear mount unit 234.

In some embodiments, the front pivot unit 236 may include a pivot constraint feature 520 that is coupled to the central bracket 392 and the crossbar 394. The pivot constraint feature 520 may include engagement surfaces 522 that are configured to interact with the stops 500 to constrain pivotal movement of the front pivot unit 236 relative to the rear mount unit 234 during operation of the agricultural harvesting head 106, at least in some embodiments. Additionally, in some embodiments, the engagement surfaces 522 may define cutouts 524 of the pivot constraint feature 520 that open toward the bracket plate 506. Furthermore, in some embodiments, the pivot constraint feature 520 may be configured to at least partially receive the pivot bearing 504.

In the illustrative embodiment, the equalizer bar 356 is formed to include an interior cavity 526 that is sized to receive the rod head 516 of the rod 512. Thus, the equalizer bar 356 and the central bracket 392 are spaced from one another to accommodate partial positioning of the rod body 514 in the passageway 510 and positioning of the rod head 516 in the interior cavity 526. In some embodiments, the interior cavity 526 may be fluidly coupled to a bore 528 that extends at least partway through the equalizer bar 356. In those embodiments, a fastener (not shown) may be received in the bore 528 such that the fastener extends through an aperture 530 formed in the rod head 516 of the rod 512 to secure the rod 512 to the equalizer bar 356.

Figure 6:
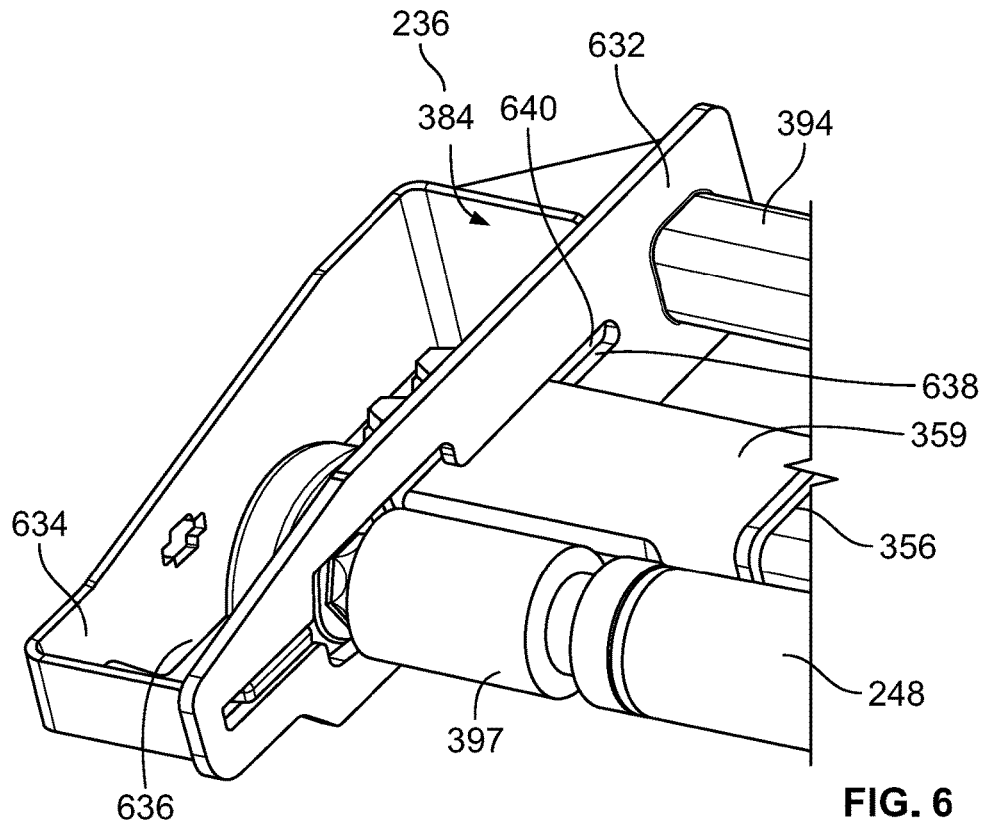
FIG. 6 is a detail view of an end bracket of a front pivot unit of the tension frame assembly shown in FIG. 3.

Referring now to FIG. 6, the illustrative end bracket 384 of the front pivot unit 236, which is substantially identical to the end bracket 386 (detailed discussion of which is omitted), includes a guide plate 632 and a backing plate 634 that is coupled to, and extends outwardly from, the guide plate 632. The guide plate 632 and the backing plate 634 cooperatively define an interior space 636 of the end bracket 384. The crossbar 394 is coupled to the guide plate 632, as is each of the front roller 248 (via the bearing 397) and the equalizer bar 356 (via the end coupler 359). In some embodiments, a portion of each of the crossbar 394, the front roller 248, and the equalizer bar 356 may be positioned in the interior space 636. In any case, in the illustrative embodiment, a slot 638 formed in the end bracket 384 is sized to receive the end coupler 359 of the equalizer bar 356. Depending on tension applied to the equalizer bar 356 during operation of the tension frame assembly 228, as further discussed below, the equalizer bar 356 is movable in the slot 638 toward either of the crossbar 394 and the front roller 248, as indicated by arrow 640.

Figure 7:
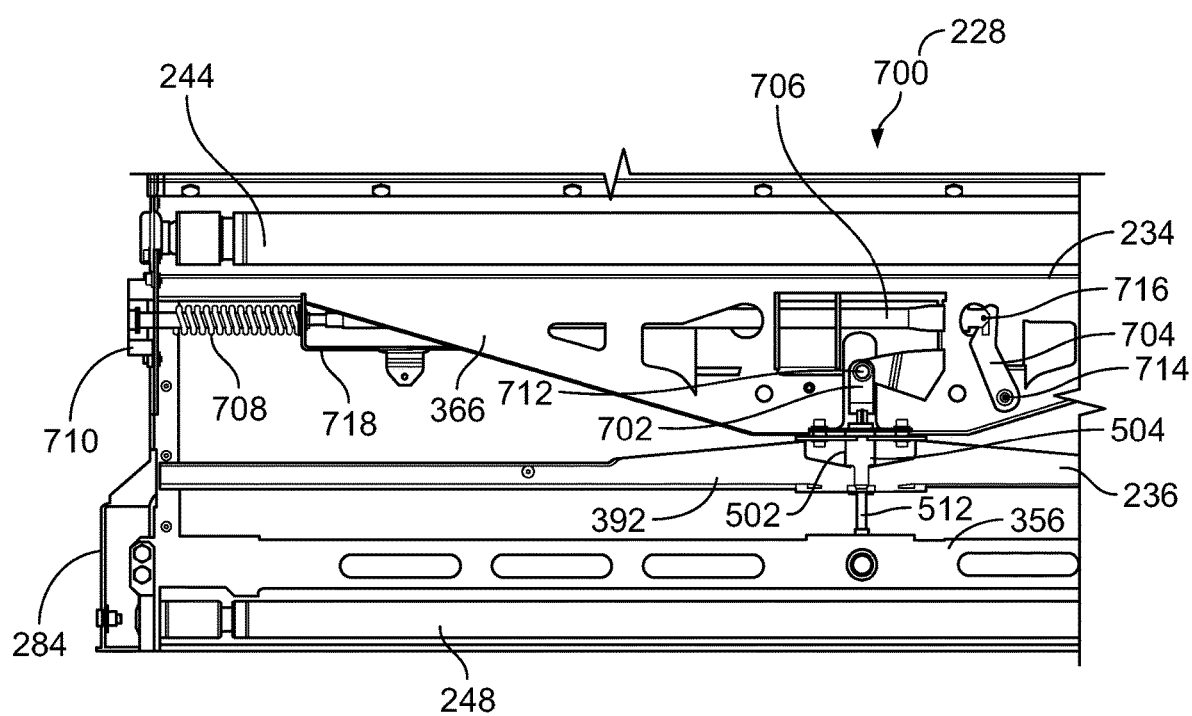
FIG. 7 is a top view of another portion of the tension frame assembly that may be included in the conveyor system of the agricultural harvesting head of FIG. 2.

Referring now to FIG. 7, a portion 700 of the illustrative tension frame assembly 228 is coupled to the rod 512 and the pivot joint 502. The portion 700 includes, but is not limited to, a rod link 702, a bell crank arm 704, a lever arm 706, a spring 708, and a securing bracket 710. The rod link 702 is coupled to, and may receive, at least in some embodiments, the rod 512. The bell crank arm 704 is coupled to the rod link 702 via a fastener 712. The bell crank arm 704 is coupled to the central housing 366 via a fastener 714 and to the lever arm 706 via fastener 716. The lever arm 706 is also coupled to the securing bracket 710, which is coupled to the rear mount unit 234. The spring 708 extends around the lever arm 706 and is positioned between the securing bracket 710 and a member 718, which is coupled to the rear mount unit 234. It should be appreciated that in addition to the aforementioned elements, the portion 700 may include one or more rods, bars, linkages, frames, members, beams, arms, belts, wires, shields, covers, plates, guides, tracks, or the like.

During operation of the agricultural harvesting head 106, it may be desirable to adjust tension applied to one or more components of the conveyor system 226 via the tension frame assembly 228. Individual or cooperative operation of one or more components of the portions 330, 700 of the tension frame assembly 228 may cause, or otherwise be associated with, application of tensile forces to the equalizer bar 356. In some embodiments, those tensile forces may cause, or otherwise be associated with, movement of the equalizer bar 356 in the slots 638 toward the front roller 248, which may be said to be an idler roller. In such embodiments, when the tensile forces are not applied to the equalizer bar 356, the equalizer bar 356 may move in the slots 638 toward the crossbar 394. In any case, interaction between the equalizer bar 356 and the pivot joint 502 (e.g., positioning of the rod 512 in the interior cavity 526) may facilitate movement of the equalizer bar 356 in the slots 638, which may adjust the tensile forces applied thereto. Such movement may also cause, or otherwise be associated with, adjustment of tensile forces applied to the front roller 248 or to the belt 252. In that sense, at least in some embodiments, the equalizer bar 356 may be said to cooperate with the rod 512 to facilitate adjustment of tension applied to one or more components of the conveyor system 226.

Figure 8:
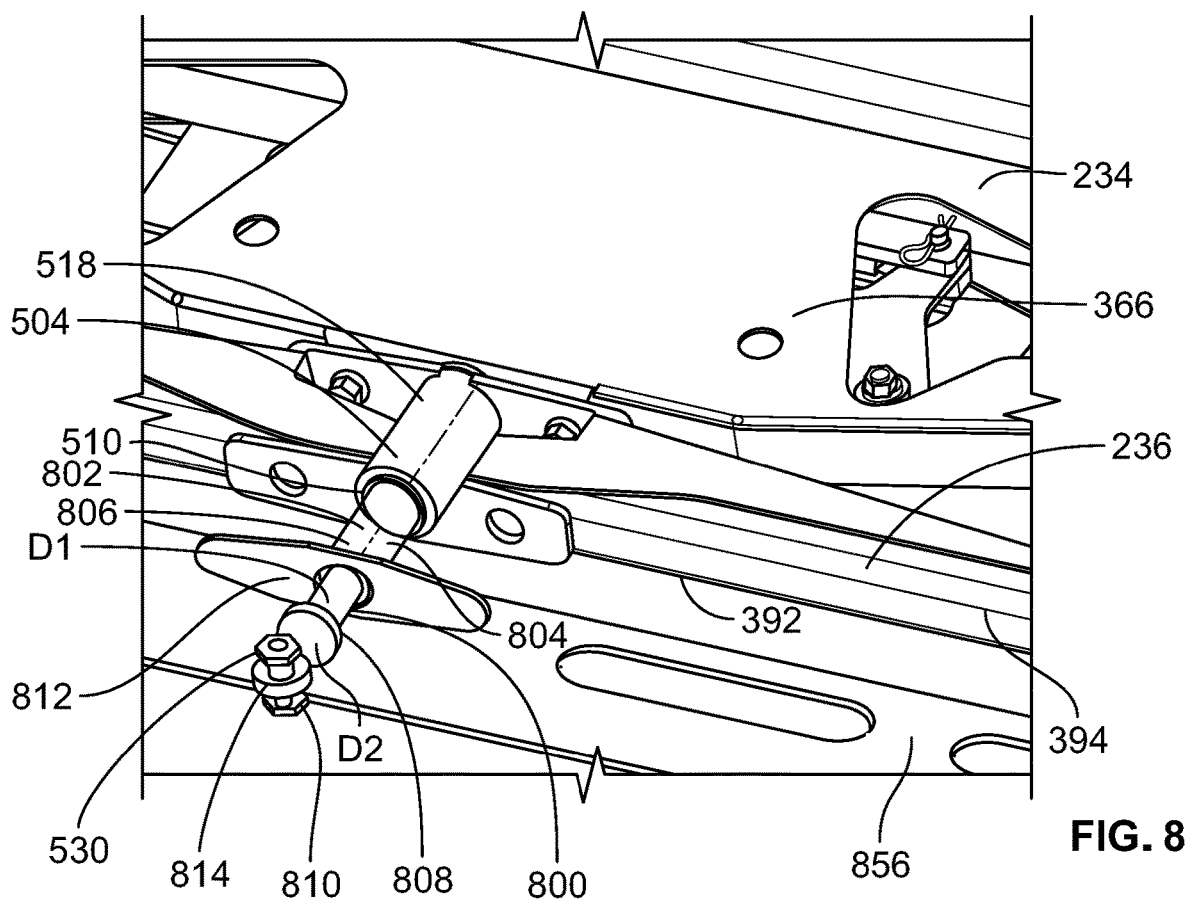
FIG. 8 is a detail view of another central pivot of another tension frame assembly that may be included in the agricultural harvesting head of FIG. 2.

Referring now to FIG. 8, in the illustrative embodiment, the rear mount unit 234 may include a front pivot unit interface 800 that may be used in place of, and to provide substantially the same function of, the front pivot unit interface 476. As such, the central bracket 392, the front pivot unit interface 800, and the pivot bearing 504 may cooperatively establish an illustrative pivot joint 802. It should be appreciated, of course, that the pivot joint 802 may be used in place of, and to provide substantially the same function of, the pivot joint 502. Accordingly, during operation of the agricultural harvesting head 106, the pivot joint 802 may enable, or otherwise facilitates, pivotal movement of the front pivot unit 236 relative to the rear mount unit 234.

In the illustrative embodiment, the front pivot unit interface 800 includes, or is otherwise embodied as, a cylindrical rod 804 and a pin 810 coupled thereto. The cylindrical rod 804 is sized to be received in the passageway 510 and the pin 810 is sized to be received by an equalizer bar 856, which is similar to the equalizer bar 356. The rod 804 includes a rod body 806 and a rod head 808 that is coupled to the rod body 806. The rod body 806 has a diameter D1 that is less than a diameter D2 of the rod head 808. The rod body 806 is sized to extend through the passageway 510 and beyond the bracket plate 508 such that the rod head 808 is positioned outside of the passageway 510 when the front pivot unit 236 is pivotally coupled to the rear mount unit 234 at the pivot joint 802. The rod body 806 is also sized for receipt by the sleeve 518 such that during operation of the agricultural harvesting head 106, the rod 804, the sleeve 518, and the central bracket 392 are configured to interact to permit pivotal movement of the front pivot unit 236 relative to the rear mount unit 234.

In the illustrative embodiment, the equalizer bar 856 is formed to include an interior cavity 812 that is sized to receive the rod head 808. In some embodiments, the interior cavity 812 may be sized to receive at least a portion of the rod body 806. In any case, the equalizer bar 856 and the central bracket 392 are spaced from one another to accommodate partial positioning of the rod body 806 in the passageway 510 and positioning of the rod head 808 in the interior cavity 812. In some embodiments, the interior cavity 812 may be fluidly coupled to a bore 814 that extends at least partway through the equalizer bar 856. In those embodiments, the bore 814 may be sized to receive the pin 810 to facilitate securement of the rod 804 to the equalizer bar 856.

Figure 9:
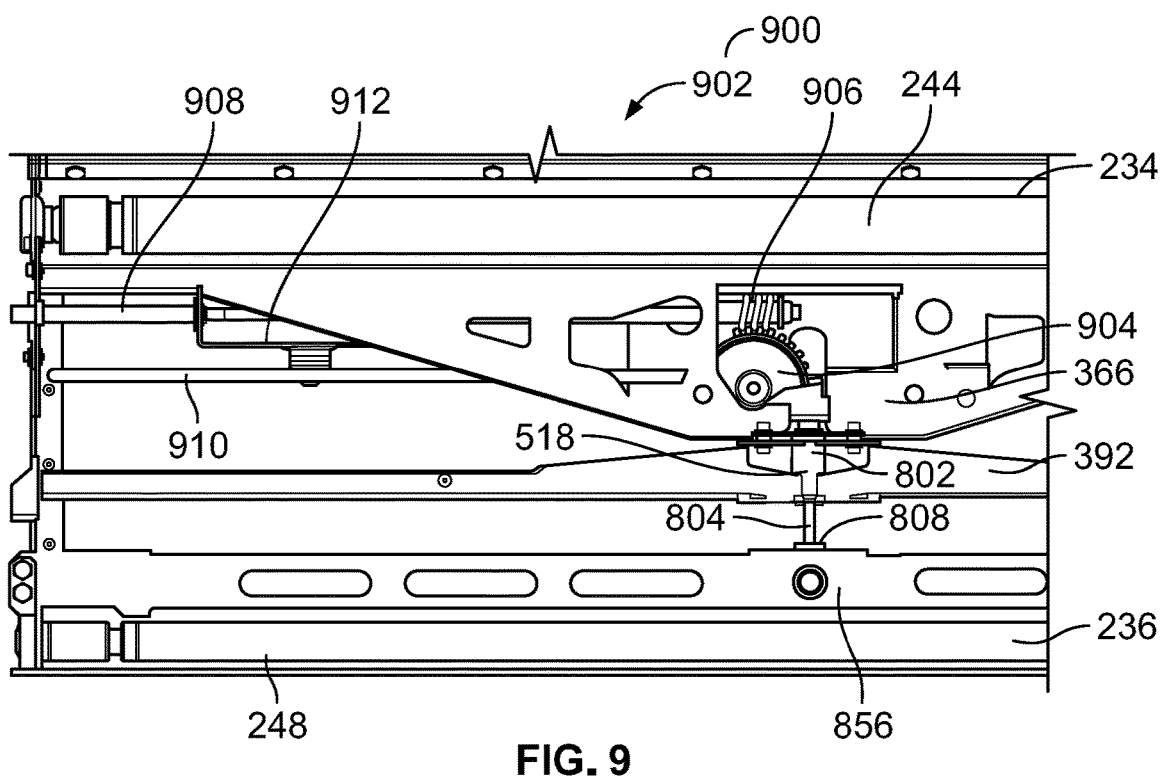
FIG. 9 is a top view of a portion of the tension frame assembly associated with the central pivot of FIG. 8.

Referring now to FIG. 9, a portion 902 of an illustrative tension frame assembly 900 is coupled to the rod 804 and the pivot joint 802. It should be appreciated that the tension frame assembly 902 may be used in place of, and to provide substantially the same function of, the tension frame assembly 228. Moreover, it should be appreciated that the tension frame assembly 902 may be similar to, and may include some of the elements incorporated into, the tension frame assembly 228. For example, the tension frame assembly 902 may include the rear mount unit 234 and the front pivot unit 236, among other elements included in the tension frame assembly 228. In any case, it should be appreciated that the pivot joint 802 and the equalizer bar 856 are included in, or otherwise associated with, the tension frame assembly 902.

The illustrative portion 900 of the tension frame assembly 228 includes, but is not limited to, a sector gear 904 coupled to the rod 804 and a worm gear 906 intermeshed with the sector gear 904 and coupled to the rear mount unit 234 via a shaft 908. The sector gear 904 is also coupled to a shaft 910 that is spaced from the shaft 908. The shafts 908, 910 are coupled to one another via a member 912, which is coupled to the rear mount unit 234. It should be appreciated that in addition to the aforementioned elements, the portion 900 may include one or more rods, bars, linkages, frames, members, beams, arms, belts, wires, shields, covers, plates, guides, tracks, or the like.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A harvesting machine comprising:
a main frame;
a cutter assembly pivotally coupled to the main frame, wherein the cutter assembly includes a cutter bar configured to sever crop material adjacent to the ground and a cutter frame configured to support the cutter bar for pivotal movement relative to the main frame; and
a conveyor system coupled to the main frame that is centrally positioned to convey severed crop material in a rearward direction away from the cutter bar toward a central feed drum of the harvesting machine, wherein the conveyor system includes a rear mount unit affixed to the main frame and a front pivot unit positioned forward of the rear mount unit that is pivotally coupled to the rear mount unit along a central axis of the conveyor system, and wherein the front pivot unit is coupled to the cutter assembly to permit the front pivot unit and the cutter bar to pivot relative to the main frame based on a contour of the ground during operation of the harvesting machine.

2. The harvesting machine of claim 1, wherein the rear mount unit includes a rear roller that is configured for rotation about a rear roller axis, the front pivot unit includes a front roller that is configured for rotation about a front roller axis, and the front roller axis may be angled relative to the rear roller axis when the front pivot unit and the cutter bar pivot relative to the main frame during operation of the harvesting machine.

3. The harvesting machine of claim 2, wherein the central feed drum is configured for rotation about a feed drum axis, and wherein the feed drum axis is parallel to the rear roller axis when the front pivot unit and the cutter bar pivot relative to the main frame during operation of the harvesting machine.

4. The harvesting machine of claim 1, wherein the rear mount unit includes a central housing and a front pivot unit interface that extends outwardly of the central housing toward the front pivot unit, and wherein the front pivot unit interface is located along the central axis of the conveyor system.

5. The harvesting machine of claim 4, wherein the front pivot unit includes a central bracket configured to receive the front unit pivot interface of the rear mount unit, and wherein the central bracket is located along the central axis of the conveyor system.

6. The harvesting machine of claim 5, wherein the front pivot unit interface includes a rod and the central bracket at least partially defines a passageway sized to receive the rod.

7. The harvesting machine of claim 6, wherein the front pivot unit includes a pivot bearing coupled to the central bracket that is configured to interact with the rod to permit pivotal movement of the front pivot unit relative to the rear mount unit during operation of the harvesting machine.

8. The harvesting machine of claim 5, wherein the rear mount unit includes a first end plate and a second end plate arranged opposite the first end plate, the central housing is positioned between the first and second end plates, and the first and second end plates are coupled to opposite ends of a rear roller of the rear mount unit to support the rear roller.

9. The harvesting machine of claim 8, wherein the front pivot unit includes a first end bracket and a second end bracket arranged opposite the first end bracket, the central bracket is positioned between the first and second end brackets, and the first and second end brackets are coupled to opposite ends of a front roller of the front pivot unit to support the front roller.

10. The harvesting machine of claim 9, wherein the conveyor system further includes an equalizer bar sized for receipt in slots formed in each of the first and second end brackets, and wherein the equalizer bar is configured to receive the front pivot unit interface of the rear mount unit.

11. The harvesting machine of claim 10, wherein the equalizer bar cooperates with at least one of the front pivot unit interface and the front pivot unit to facilitate adjustment of tension applied to at least one component of the conveyor system during operation of the harvesting machine.

12. The harvesting machine of claim 11, wherein the at least one component includes a belt that is wound at least partway around the rear roller and the front roller.

13. An agricultural harvesting head comprising:
a main frame;
a cutter assembly pivotally coupled to the main frame, wherein the cutter assembly is configured to sever crop material adjacent to the ground; and
a conveyor system coupled to the main frame that is positioned along a central axis of the agricultural harvesting head to convey severed crop material rearwardly, wherein the conveyor system includes a rear mount unit affixed to the main frame and a front pivot unit pivotally coupled to the rear mount unit by a pivot joint located along the central axis, and wherein the front pivot unit is coupled to the cutter assembly for common pivotal movement with the cutter assembly relative to the main frame.

14. The agricultural harvesting head of claim 13, wherein the conveyor system further includes an equalizer bar that is supported by the front pivot unit and configured to cooperate with at least one of the rear mount unit and the front pivot unit to facilitate adjustment of tension applied to at least one component of the conveyor system during operation of the agricultural harvesting head.

15. The agricultural harvesting head of claim 13, wherein the rear mount unit includes a rear roller that is configured for rotation about a rear roller axis, the front pivot unit includes a front roller that is configured for rotation about a front roller axis, and the front roller axis may be angled relative to the rear roller axis when the front pivot unit and the cutter bar pivot relative to the main frame.

16. An agricultural harvesting head comprising:
a main frame;
a cutter assembly pivotally coupled to the main frame, wherein the cutter assembly is configured to sever crop material adjacent to the ground; and
a conveyor system coupled to the main frame that is centrally positioned to convey severed crop material rearwardly, wherein the conveyor system includes a rear mount unit affixed to the main frame, a front pivot unit pivotally coupled to the rear mount unit and coupled to the cutter assembly for common pivotal movement with the cutter bar relative to the main frame, and an equalizer bar that is supported by the front pivot unit and configured to cooperate with at least one of the rear mount unit and the front pivot unit to facilitate adjustment of tension applied to at least one component of the conveyor system during operation of the agricultural harvesting head, and wherein the front pivot unit and the rear mount unit are pivotally coupled together by a pivot joint that is located along a central axis of the conveyor system.

17. The agricultural harvesting head of claim 16, wherein the rear mount unit includes a rear roller that is configured for rotation about a rear roller axis, the front pivot unit includes a front roller that is configured for rotation about a front roller axis, and the front roller axis may be angled relative to the rear roller axis when the front pivot unit and the cutter bar pivot relative to the main frame during operation of the agricultural harvesting head.

18. The agricultural harvesting head of claim 17, wherein the at least one component of the conveyor system includes a belt that is wound at least partway around the rear roller and the front roller such that a central portion of the belt is located along the central axis, and the location of the pivot joint facilitates application of tension to opposite ends of the belt by the rear and front rollers to maintain the location of the central portion of the belt along the central axis during operation of the agricultural harvesting head.

19. The agricultural harvesting head of claim 18, wherein at least a portion of the pivot joint is received by the equalizer bar, and wherein the central axis is arranged perpendicular to the rear roller axis.

\* \* \* \* \*